United States Patent [19]

Robinson et al.

[11] Patent Number: 4,742,454
[45] Date of Patent: May 3, 1988

[54] APPARATUS FOR BUFFER CONTROL BYPASS

[75] Inventors: Theodore S. Robinson, Cupertino; Donald L. Hanson, Los Altos Hills; Gary A. Woffinden, Scotts Valley, all of Calif.

[73] Assignee: Amdahl Corporation, Sunnyvale, Calif.

[21] Appl. No.: 527,673

[22] Filed: Aug. 30, 1983

[51] Int. Cl.⁴ .............................. G06F 13/00
[52] U.S. Cl. ..................................... 364/200
[58] Field of Search ... 364/200 MS File, 900 MS File

[56] References Cited

U.S. PATENT DOCUMENTS

| | | | |
|---|---|---|---|
| 3,573,744 | 4/1971 | Rigazio | 364/200 |
| 4,208,716 | 6/1980 | Porter et al. | 364/200 |
| 4,258,418 | 3/1981 | Heath | 364/200 |
| 4,527,233 | 7/1985 | Ambrosius, IV et al. | 364/200 |

Primary Examiner—Eddie P. Chan
Attorney, Agent, or Firm—Fliesler, Dubb, Meyer & Lovejoy

[57] ABSTRACT

Access control to a high speed data buffer in a data processing machine is bypassed in order to enhance the speed of access of data which must be retrieved from a large capacity main storage facility without requiring additional circuitry in the data processing machine. Access control normally requires an entire line of data to be present in a cache before allowing a read to a portion of the line. When lines are moved in to the cache, only sub-line increments are loaded at a time. Thus, when a line is being moved in from a main store to the cache, the increment that satisfies a pending request for access is transferred first. The access control is overridden to allow access to the increment before the balance of the line is transferred.

6 Claims, 2 Drawing Sheets

APPARATUS FOR BUFFER CONTROL BYPASS

FIELD OF THE INVENTION

The present invention relates to the control of data flow in a data processing machine. Particularly the field of the invention is the access of data from a main storage unit in a data processing machine by a central processing unit.

BACKGROUND OF THE INVENTION

A typical data processing machine consists of a central processing unit which processes data stored in a storage facility. An important attribute of a good data processing machine is that the central processing unit has fast access to the data stored in the machine. However a large storage facility which will provide fast access to data is very expensive, so data processing machines have an intermediate storage facility which is smaller in size than the main storage unit but which provides very fast access to data for the central processing unit. This intermediate storage facility, known as a buffer or cache, holds blocks of data such as instructions or operands, and allows the central processing unit to access the instructions and operands it needs very fast. The contents of the buffer are continually updated to try to keep available data which the program currently executing in the central processing unit needs. If the central processing unit calls for data which is not resident in the buffer, then the buffer must retrieve the data from the main storage unit for presentation to the central processing unit.

The access of data from the main storage unit is a time consuming process. Further, the steps of storing the data from the mainstore into the buffer once the data has been retrieved from the mainstore requires time. So the access to data by the central processing unit can be enhanced by avoiding the intermediate step of writing data into the buffer before presenting the data to the central processing unit when the data must be accessed from the mainstore.

The time required to get data from the mainstore to the central processing unit has been reduced in the past by providing a bypass path for the data. The bypass path allows data to be presented to the central processing unit in parallel with the write of the data into the buffer. In this manner, the intermediate step of writing the data into the buffer does not contribute to the length of time required for accessing data from the mainstore. However, bypass paths require additional circuitry in the data processing machine which is costly.

Thus there is a need for an apparatus whereby the speed of access to data in the mainstore by the central processing unit is enhanced without requiring costly additional circuitry in the machine.

SUMMARY OF THE INVENTION

In accordance with the foregoing, the present invention provides an apparatus whereby data is moved from the mainstore through the buffer to the central processing unit quickly without requiring additional circuitry in the machine.

The present invention provides a data processing machine comprising a first storage means, such as a mainstore, for providing large capacity machine storage space and a second storage means, such as a buffer, in communication with the first storage means for storing data accessed from the first storage means in lines of a plurality of blocks of a plurality of bytes. The data processing machine further includes a central processing means for accessing the lines of data in the second storage means and processing the blocks of data. Access control means for controlling the access of the central processing means to the lines of data in the second storage means monitors the completion of transfers of the lines of data between the first storage means and the second storage means. The present invention further provides a bypass control means for allowing the central processing means to access the second storage means for part of a requested line of data before the transfer of the requested line of data from the first storage means to the second storage means is completed. In this manner, the central processing means may begin processing on a block from part of the requested line of data before the whole line has been stored into the second storage means.

Because the central processing means processes data in blocks that are smaller than a line of data, the present invention allows the central processing means to access the block of data that it needs from a requested line before the whole line becomes written into the second storage means. Thus when a central processing unit requests a block of data which must be retrieved from the first storage means, the bypass control means allows access to the needed block of data when the needed block reaches the second storage means even though the access control means will detect that the line of data as it exists in the second storage means is incomplete.

Thus the present invention achieves the object of enhancing the speed of access of the central processing means to data stored in the main storage unit through the buffer without requiring additional costly circuitry in the machine.

DETAILED DESCRIPTION

With reference to the drawings, detailed description of the preferred embodiment of the present invention is provided.

Figure 1:
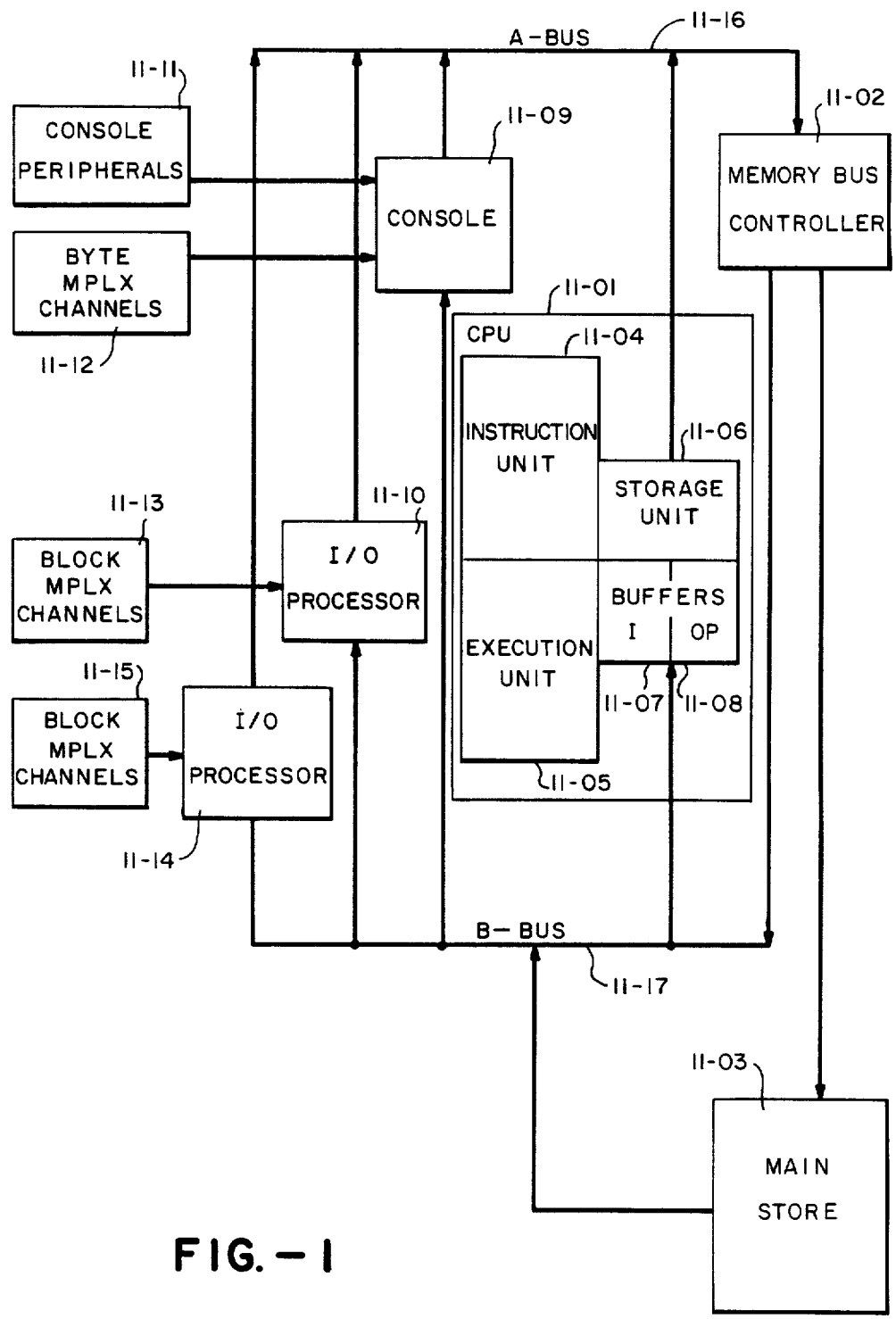
FIG. 1 is a block diagram of a system overview of a data processing machine employing the present invention.

FIG. 1 shows a block diagram of a system overview of the data processing machine D which employs the present invention. The present invention is most closely associated with the central processing unit 11-01, the memory bus controller 11-02, and a main storage unit 11-03. The central processing unit 11-01 includes five subparts as follows: the instruction unit 11-04 (I-UNIT) which fetches, decodes, and controls instructions and controls the central processing unit; the execution unit 11-05 (E-UNIT) which provides computational facilities for the data processing machine; the storage unit 11-06 (S-UNIT) which controls the data processing machines instruction and operand storage and retrieval facilities; the instruction buffer 11-07 which provides high-speed buffer storage for instruction streams; and the operand buffer 11-08 provides high-speed buffer storage for operand data.

Other major parts of a data processing machine as shown in FIG. 1 include the input-output processor 11-10 (IOP) which receives and processes input-output requests from the central processing unit 11-01 and provides block multiplexer channels; the console 11-09 which communicates with the central processing unit 11-01 to provide system control and byte multiplexer channels; the memory bus controller 11-02 (MBC) which provides main memory and bus control, system wide coordination of functions and timing facilities; and the main storage unit 11-03 which provides system large capacity memory. A second input-output processor 11-14 and additional multiplexer channels 11-15 may be included as shown in FIG. 1.

The data processing machine shown in FIG. 1 employs a dual bus structure: The A bus 11-16 and the B bus 11-17. The A bus 11-16 carries data from the console 11-09, the input-output processor 11-10, and the central processing unit 11-01 to the memory bus controller 11-02. The B bus 11-17 carries data from the memory bus controller 11-02 and the main storage unit 11-03 to the console 11-09, the input-output processor 11-10 and the central processing unit 11-01.

For a more detailed description of the system overview shown in FIG. 1 refer to the patent application entitled "VIRTUALLY ADDRESSED CACHE", invented by Gene Myron Amdahl, Donald Laverne Hanson and Gary Arthur Woffinden, filed contemporaneously herewith and owned by a common assignee. (now U.S. Pat. No. 4,612,612 issued 09/16/86.)

The present application is concerned in the preferred embodiment with the flow of instructions and operands from the mainstore 11-03 to the instruction buffer 11-07 and operand buffer 11-08 respectively and on to the CPU 11-01. The preferred embodiment is described with respect to the instruction buffer 11-07 and the I-Unit 11-04, however, it is used also with the flow of data through the operand buffer 11-08 into the E-Unit 11-05.

The process of retrieving an instruction from the storage facilities, either the buffer 11-07 or the mainstore 11-03, is termed an instruction fetch. Each line of data may be broken down into four quarterlines of data each quarterline being eight bytes long. Any instruction block that the I-Unit 11-04 decides to process will reside within a given line of data, however, an instruction block may reside in parts of two quarterlines of the line. The I-Unit 11-04 requests an instruction block by determining the address of the first byte of data within the requested instruction block and retrieving the instruction block defined by this address.

Figure 2:
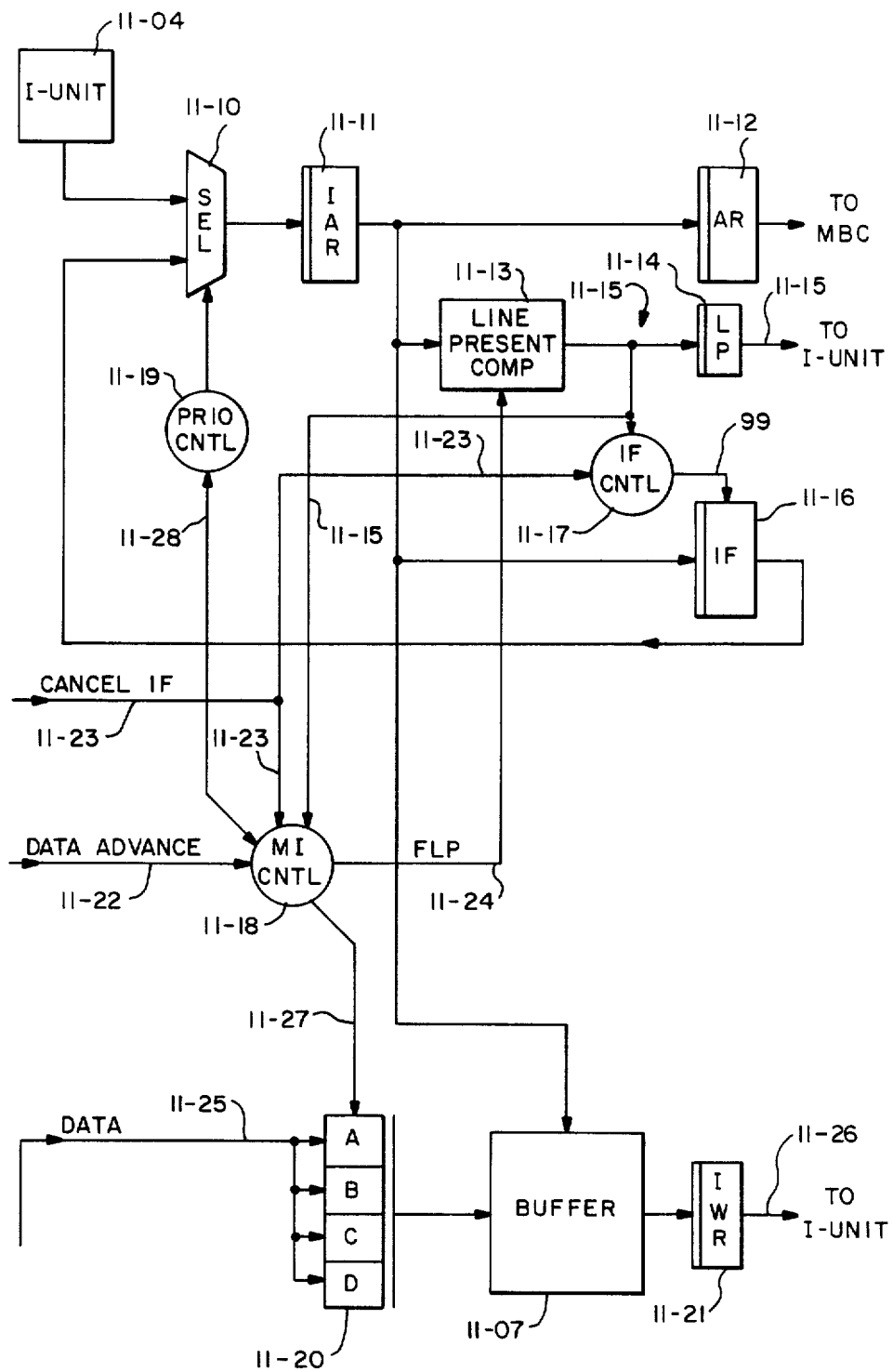
FIG. 2 is a schematic diagram of the preferred embodiment of the present invention.

The preferred embodiment of the present invention may be described with reference to FIG. 2. An instruction fetch begins with an address calculated by the I-Unit 11-04 and presented to the instruction address selector 11-10. Once selected, the address of the requested instruction block is presented to the instruction address register 11-11 where the address is read by a line present comparator 11-13 which determines whether the line containing the requested instruction block is present in the instruction buffer 11-07. The line present comparator 11-13 can operate in a variety of ways.

For instance, in the preferred embodiment the line present comparator 11-13 comprises a two part mechanism including a tag field associated with each line in the buffer 11-07 and a translation lookaside buffer (TLB) which holds translations from the virtual address used to access the buffer 11-07 to the system address used to access the mainstore 11-03. The tag field holds a TLB address which accesses the translation for lines in the buffer 11-07 from the TLB. The TLB address is generated from a hash of a subset of the virtual address bits, so the line present comparator 11-13 matches the TLB address stored in the tag field for a given line with the TLB address generated by hashing the virtual address of the requested instruction block. Further, the virtual address of the requested instruction block is matched with the virtual address bits not used to access the TLB that are stored in the TLB. If both the tag field matches the generated TLB address for the virtual address of the requested instruction block, and the virtual address bits from the TLB match, then the line present comparator 11-13 indicates that the line for the requested instruction block is present in the buffer 11-07. However, the specific embodiment of the line present comparator is not important to the present invention.

The present invention is concerned with the situation in which the line present comparator 11-13 fails to indicate that the line of the requested instruction block in the instruction address register 11-11 is present in the instruction buffer 11-07. In this situation the line present comparator 11-13 will generate a line-not-present signal 11-15 indicating that the line of the instruction block requested by the instruction address register 11-11 is not resident in the buffer 11-07. The line-not-present signal 11-15 is presented to the instruction fetch port control 11-17 which causes by signal across line 99 the instruction address in the instruction address register 11-11 to be written into the instruction fetch port 11-16 to await the access of the data from the mainstore 11-03 which takes several cycles. The line-not-present signal 11-15 is latched at the line present latch 11-14 and presented to the I-Unit 11-04 and the move-in controller 11-18 signalling that the data requested must be accessed from the mainstore 11-03. Further the line-not-present signal 11-15 is presented from the line present latch 11-14 to the MBC 11-02 to initiate an access of the data from the mainstore 11-03. The address in the instruction address register 11-11 clocks through the address register 11-12 for timing purposes.

If during the interval that the I-Unit 11-04 waits for the access to mainstore 11-03 for an instruction block whose address resides in the instruction fetch port 11-16, the I-Unit 11-04 cancels its need for the requested instruction block, then the I-Unit 11-04 will generate a cancel instruction fetch signal 11-23 which is presented to the instruction fetch port control 11-17. Likewise, the cancel instruction fetch signal 11-23 is presented to the move-in controller 11-18 which controls the move-in of data from the mainstore 11-03 to the instruction buffer 11-07. The cancel instruction fetch signal 11-23 will release the address from the instruction fetch port 11-16 and invalidate the fetch of data from the mainstore 11-03 to the buffer 11-07. The I-Unit 11-04 may cancel a specific request for an instruction block for a variety of reasons, for instance, a branch in the instruction stream which goes around the requested instruction will cause a cancel instruction fetch signal 11-23.

Assuming that no cancel instruction fetch signal 11-23 has been generated by the I-Unit 11-04, the address of the first byte in the requested instruction block remains in the instruction fetch port 11-16 awaiting the arrival of the data from the mainstore 11-03. When the data is ready to begin transfer from the mainstore 11-03 to the buffer 11-07, the mainstore 11-03 generates a data advance signal 11-22 which communicates with the move-in controller 11-18 of the instruction buffer 11-07. After the data advance signal 11-22, the mainstore data is written into the buffer data register 11-20 a quarterline at a time. From this buffer data register 11-20, the data is written into the buffer 11-07.

While the address of the requested instruction block is in the MBC 11-02, a data ordering mechanism detects the quarterline of data which contains the first byte of the instruction block requested by the I-Unit 11-04. The quarterline containing the first byte of the instruction block is transferred to the S-Unit mainstore data register first, followed by the next sequential quarterline (mod 32). For example, if a line consists of four quarterlines 1, 2, 3 and 4 in ascending address order, and the first byte of the requested instruction block resides in quarterline 3, then the MBC 11-02 sends the quarterlines to the buffer data register in the following order: 3, 4, 1, 2. If the first byte of the requested instruction block resides in quarterline 4, then the data is returned in the following order: 4, 1, 2, 3.

The move-in controller 11-18 receives the data advance signal 11-22 and generates a force instruction fetch port priority signal 11-28 to communicate with the priority controller 11-19 of the instruction address selector 11-10. Upon receipt of priority forced by the move-in controller 11-18, the instruction address selector 11-10 selects the address from the instruction fetch port 11-16. The address is presented to the instruction address register 11-11 and through to the line present comparator 11-13. The move-in controller 11-18 generates a force line present match signal 11-24 signalling the line present comparator 11-13 that the instruction block requested by the address in the instruction fetch port 11-16 has been transferred to the instruction buffer 11-07.

By monitoring the cancel instruction fetch signal 11-23, the move-in controller 11-18 determines whether the address in the instruction fetch port 11-16 is the address of the data being moved in to the buffer 11-07. If the address of the requested instruction block is not in the instruction fetch port 11-16 when the data is moved into the buffer 11-07, then the force line present match signal 11-24 is not generated. Otherwise, by the time the first two quarterlines of data have been transferred through the buffer data register 11-20 into the buffer 11-07, the force line present match signal 11-24 causes the line present comparator 11-13 to allow the I-Unit 11-04 to access the instruction block it is requesting from the buffer 11-07.

The timing of the events of the present invention can be understood with reference to Table 1. The first reference cycle shown in Table 1 of the instruction fetch of data for an instruction block coming from the mainstore 11-03 is the mainstore data advance signal 11-22. In the next cycle the data begins moving across a mainstore interface (not shown) a quarterline at a time into a mainstore data register in the S-Unit 11-06. Trailing the appearance of the data at the mainstore data register in the S-Unit 11-06 (not shown) by one cycle, the data appears at the buffer data register 11-20 one quarterline at a time proceeding as labeled H, A, B, C, D in five cycles. The H indicates a header is transferred which includes various control information. The A, B, C, and D indicate the transfer of quarterlines A, B, C, and D, where quarterline A includes the first byte of the requested instruction block.

TABLE 1

| Cycle: | 1 | 2 | 3 | 4 | 5 | 6 | 7 | 8 | 9 |
|---|---|---|---|---|---|---|---|---|---|
| Timing of Buffer Control Bypass | | | | | | | | | |
| Mainstore Data Advance 11-22: | — | | | | | | | | |
| S-Unit Mainstore Data Register (not shown): | | H | A | B | C | D | | | |
| Buffer Data Register 11-20: | | | | A | B | C | D | | |
| Write Quarterlines A and B to Buffer 11-07: | | | | | P | B | R | | |
| Fetch Quarterlines A and B to IWR (11-21): | | | | | | P | B | R | |
| Write Quarterlines C and D to Buffer (11-07): | | | | | | P | B | R | |
| Fetch Quarterline C and D: | | | | | | | P | B | R |
| Force Priority Signal 11-28: | | | | | — | | | | |
| Force Line Present Match Signal 11-24: | | | | | | — | | | |
| Requested Instruction Block Available For Processing in IWR: | | | | | | | | — | |

A write of data into the buffer 11-07 occurs in three cycles: P for attain priority, B for access buffer, and R for check results. The data is resident in the buffer 11-07 after the B cycle. Likewise a fetch of data from the buffer 11-07 occurs in three cycles: P-B-R. After the R cycle of a fetch, the data resides in the instruction word register (IWR) 11-21 of the present invention and has been checked for errors.

As can be seen with reference to Table 1, the first two quarterlines A, B are written into the buffer 11-07 at the end of the fifth reference cycle. The instruction fetch of the first two quarterlines A, B is begun in the fifth cycle and completes with the data in the instruction word register 11-21 in the seventh cycle. The last two quarterlines C, D are resident in the buffer 11-07 at the end of the seventh cycle and the storage of the line containing the requested instruction block to the buffer 11-07 is complete in the seventh cycle. The whole line is available for processing at the instruction word register (IWR) 11-21 in the ninth cycle. As can be seen in Table 1, the force priority signal 11-28 from the move-in controller occurs in the fifth cycle and the force line present match signal 11-24 occurs in the sixth cycle.

The line present comparator 11-13 sees the line of data as valid in the eighth cycle only after writing to the instruction buffer is complete in the seventh cycle. However, the move-in controller 11-18 includes buffer bypass control means for causing the line present comparator 11-13 to allow access to the first two quarterlines A, B in the sixth cycle so that the first two quarterlines can be available at the instruction word register 11-21 in the seventh cycle. In this manner, the first two quarterlines A, B are available for processing two cycles earlier than would be possible without the force priority signal 11-28 and the force line present match signal 11-24 from the bypass control means in the move-in controller 11-18.

The preferred embodiment of the present invention allows the I-Unit 11-04 to request instruction blocks in sets of eight bytes and the instruction word register 11-21 is eight bytes long. As mentioned above, the address of the instruction block generated by the I-Unit 11-04 consists of the address of the first byte in the requested instruction block and is stored in the instruction address register 11-11 for accessing the buffer 11-07 pending a fetch of the requested instruction block into the instruction word register 11-21. Upon receiving access to the buffer 11-07 for fetching an instruction block, the instruction word register receives the first byte of the instruction block as indicated by the address in the instruction address register 11-11 and the seven following bytes ignoring quarterline boundaries, unless the first byte of the instruction block resides after the first byte of the last quarterline. If the first byte of the requested instruction block is within the 4th quarterline, then the instruction word register 11-21 receives data only up to the end of the line. The I-Unit 11-04 is constrained to request only instruction blocks that reside within one line in the buffer 11-07.

Therefore, in the preferred embodiment, the bypass control means allows access to the line in the buffer 11-07 in order to assure that the instruction word register 11-21 receives access to the entire eight bytes of the requested instruction block before the balance of the line is stored. Because the first byte in the instruction block resides in the first quarterline stored and the next quarterline stored is the following quarterline in the buffer 11-07, the instruction word register 11-21 is guaranteed accelerated access to the entire eight byte requested instruction block even when the requested instruction block crosses quarterline boundaries.

In the preferred embodiment, the line present comparator 11-13 includes an access control means for controlling the access of the I-Unit to the instruction buffer 11-07. The access control means typically includes a mechanism for determining the validity of the data resident at a specific place in the instruction buffer 11-07. One of the parameters for allowing access to a line in the instruction buffer 11-07 is whether or not a move-in of the data to the buffer 11-07 from the mainstore 11-03 has been completed.

Thus with the force line present match signal 11-24 the move-in controller 11-18 is able to bypass the access control means which normally requires a complete line to be written into the buffer 11-07 before allowing an instruction block requested by the I-Unit 11-04 to be read from the buffer 11-07. When the data must be accessed from the mainstore 11-03, the move-in controller 11-18 of the preferred embodiment includes a bypass control means which allows the I-Unit 11-04 to access the buffer 11-07 for the requested part of a line of data before the line containing the requested part has been completely retrieved from the mainstore 11-03.

From the foregoing it can be seen that the present invention provides an apparatus whereby the data which is being fetched for the central processing unit 11-01 is passed through the buffer 11-07 thereby eliminating the need for additional circuitry, but transfer of the data through the buffer 11-07 is accelerated when the data must be retrieved from the mainstore 11-03. In this manner the speed of access for the central processing unit 11-01 to the data is enhanced while the cost of the data processing machine is minimized.

While the invention has been particularly shown and described with reference to the preferred embodiments thereof, it will be understood by those skilled in the art that various changes in form and in detail may be made therein without departing from the spirit and scope of the invention.

What is claimed is:

1. In a data processing machine having a cache storing lines, including a plurality of bytes, of data at cache locations identified by logical addresses, a mainstore storing lines of data at mainstore locations identified by mainstore addresses, a means for selecting one of a plurality of logical addresses to access a requested set within a line of data from the cache, a transferring means for transferring a line of data from the mainstore in sub-line increments to the cache if the line that includes a requested set is not stored in the cache; and a cache controller, including a translator for identifying mainstore addresses for lines of data stored in cache locations and for identifying mainstore addresses for lines of data that include a byte of data within a requested set identified by a logical address, means connected to said translator for signalling a line present condition indicating whether the line of data that includes the requested set is stored in the cache by comparing the mainstore address of the line stored at the cache location with the mainstore address of the line that includes the requested set, means for allowing access to the cache only in the line present condition when an entire line including a byte of data in the requested set is present in the cache, an improvement comprising:

means, in communication with the means for selecting and the cache controller, for holding a logical address selected by the selecting means requesting a set of data from a line not stored in the cache pending transfer of the line from the mainstore by the transferring means;

means, in communication with the transferring means and with the means for selecting and responsive to a transfer of a sub-line increment or increments including the requested set of data to the cache, for forcing selection of the logical address in the means for holding by the means for selecting without waiting for the entire line to be transferred; and means, in communication with the cache controller and responsive to the transfer of the sub-line increment or increments including the requested set, for generating a force line present match signal to said line present comparing means, said line present comparing means responsive to said force line present match signal for signalling a line present condition in order to allow access to the cache before the entire line is transferred to the cache.

2. The improvement of claim 1, further including a move-in register connected between the mainstore and the cache for holding a line of data being moved in from the mainstore to the cache.

3. The improvement of claim 1, further including:
data ordering means in communication with said mainstore and cache for ordering the transfer of said sub-line increments of data within a line from said mainstore to said cache in response to a request for a given set of data by said central processing means in order to provide the sub-line increment or increments containing said given set of data to said cache before the remainder of said line.

4. The improvement of claim 3, wherein:
said sets of data may include data from more than one consecutive sub-line increments of data;
said lines are transferred between said mainstore and said cache in sub-line increments; and
said cache controller allows access by said central processing means to more than one consecutive sub-line increment at a time.

5. The apparatus of claim 4, wherein:
said sub-line increments of data are eight bytes long;
said sets of data are eight bytes long; and
said sets may include data from two consecutive sub-line increments.

6. The improvement of claim 4, wherein:
said sets of data include data from only one line.

* * * * *